US012033778B2

(12) United States Patent
Yoshino et al.

(10) Patent No.: US 12,033,778 B2
(45) Date of Patent: Jul. 9, 2024

(54) COIL COMPONENT AND CIRCUIT BOARD HAVING THE SAME

(71) Applicant: TDK Corporation, Tokyo (JP)

(72) Inventors: Hanako Yoshino, Tokyo (JP); Keigo Higashida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 606 days.

(21) Appl. No.: 17/177,393

(22) Filed: Feb. 17, 2021

(65) Prior Publication Data

US 2021/0257142 A1 Aug. 19, 2021

(30) Foreign Application Priority Data

Feb. 18, 2020 (JP) ................................ 2020-025597

(51) Int. Cl.

*H01F 27/28* (2006.01)
*H01F 17/04* (2006.01)
*H01F 27/29* (2006.01)

(52) U.S. Cl.

CPC ....... *H01F 17/045* (2013.01); *H01F 27/2828* (2013.01); *H01F 27/292* (2013.01)

(58) Field of Classification Search

CPC .. H01F 17/045; H01F 27/2828; H01F 27/292; H01F 27/40; H01F 2027/065
See application file for complete search history.

(56) References Cited

U.S. PATENT DOCUMENTS

| | | | | |
|---|---|---|---|---|
| 2008/0084254 | A1 | 4/2008 | Takahashi et al. | |
| 2010/0045418 | A1* | 2/2010 | Nishikawa | H01F 17/045 336/206 |
| 2010/0090790 | A1* | 4/2010 | Azuma | H01F 17/045 336/221 |
| 2017/0062122 | A1* | 3/2017 | Kanbe | H01F 27/2823 |
| 2018/0070451 | A1* | 3/2018 | Takagi | H05K 3/3442 |

FOREIGN PATENT DOCUMENTS

| | | | |
|---|---|---|---|
| JP | 3000998 | B1 | 1/2000 |
| JP | 2005-347379 | A | 12/2005 |
| JP | 2005347379 | * | 12/2005 |
| JP | 2011-082463 | A | 4/2011 |

* cited by examiner

*Primary Examiner* — Mang Tin Bik Lian
(74) *Attorney, Agent, or Firm* — Rimon P.C.

(57) ABSTRACT

Disclosed herein is a coil component that includes a core having a winding core part, a first flange part positioned at one axial end of the winding core part, and a second flange part positioned at other axial end of the winding core part; a wire wound around the winding core part; a first conductive member overlapping the wire through a dielectric; a first terminal electrode provided on the first flange part and connected to one end of the wire; a second terminal electrode provided on the second flange part and connected to other end of the wire; and a third terminal electrode provided on the first flange part and connected to the first conductive member.

18 Claims, 7 Drawing Sheets

COIL COMPONENT AND CIRCUIT BOARD HAVING THE SAME

BACKGROUND OF THE INVENTION

Field of the Invention

The present invention relates to a coil component and a circuit board having the same and, more particularly, to a coil component having a drum-shaped core wound with a wire and a circuit board having such a coil component.

Description of Related Art

As a coil component having a drum-shaped core wound with wire, one described in JP 2011-82463A is known. In the coil component described in JP 2011-82463A, a wire is wound around a winding core part in three layers, and the self-resonant frequency of the coil component is adjusted by the number of turns in each winding layer.

However, the method described in JP 2011-82463A has difficulty in increasing the self-resonant frequency although being successful in reduction thereof. Further, this method cannot obtain sufficient effect in a frequency band exceeding 1 GHz.

SUMMARY

It is therefore an object of the present invention to provide a coil component capable of increasing the self-resonant frequency in a wide frequency band and a circuit board having such a coil component.

A coil component according to the present invention includes: a core having a winding core part, a first flange part positioned at one axial end of the winding core part, and a second flange part positioned at the other axial end of the winding core part; a wire wound around the winding core part; a first conductive member overlapping the wire through a dielectric; a first terminal electrode provided on the first flange part and connected to one end of the wire; a second terminal electrode provided on the second flange part and connected to the other end of the wire; and a third terminal electrode provided on the first flange part and connected to the first conductive member.

According to the present invention, a capacitive component is added between the wire and the first conductive member, resulting in an apparent reduction in a capacitive component between turns of the wire (i.e., inter-wire capacitance). This can increase the self-resonant frequency in a wide frequency band.

In the present invention, the first conductive member may be positioned between the winding core part and the wire. This can prevent drop-off of the first conductive member. Alternatively, the wire may be positioned between the winding core part and the first conductive member. This facilitates adjustment of a distance between the wire and the first conductive member.

The coil component according to the present invention may further include: a second conductive member overlapping the wire through a dielectric; and a fourth terminal electrode provided on the second flange part and connected to the second conductive member, and the first and second conductive members may be insulated from each other. With this configuration, a capacitive component between the wire and the second conductive member is also added, allowing a further increase in the self-resonant frequency. In addition, since the first and second conductive members are insulated from each other, they are prevented from functioning as a coil to prevent a reduction in inductance.

A circuit board according to the present invention includes a substrate having first, second, and third land patterns and a coil component having the above-described feature. The coil component is mounted on the substrate such that the first, second, and third terminal electrodes are connected respectively to the first, second, and third land patterns, and a ground potential is given to the third land pattern.

According to the present invention, a capacitive component is added between the wire and the ground by the first conductive member, so that an inter-connect capacitance is apparently reduced, allowing an increase in the self-resonant frequency of the coil component.

According to the present invention, there can be provided a coil component capable of increasing the self-resonant frequency thereof in a wide frequency band and a circuit board having such a coil component.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Hereinafter, a preferred embodiment of the present invention will be described in detail with reference to the accompanying drawings.

First Embodiment

Figure 1:
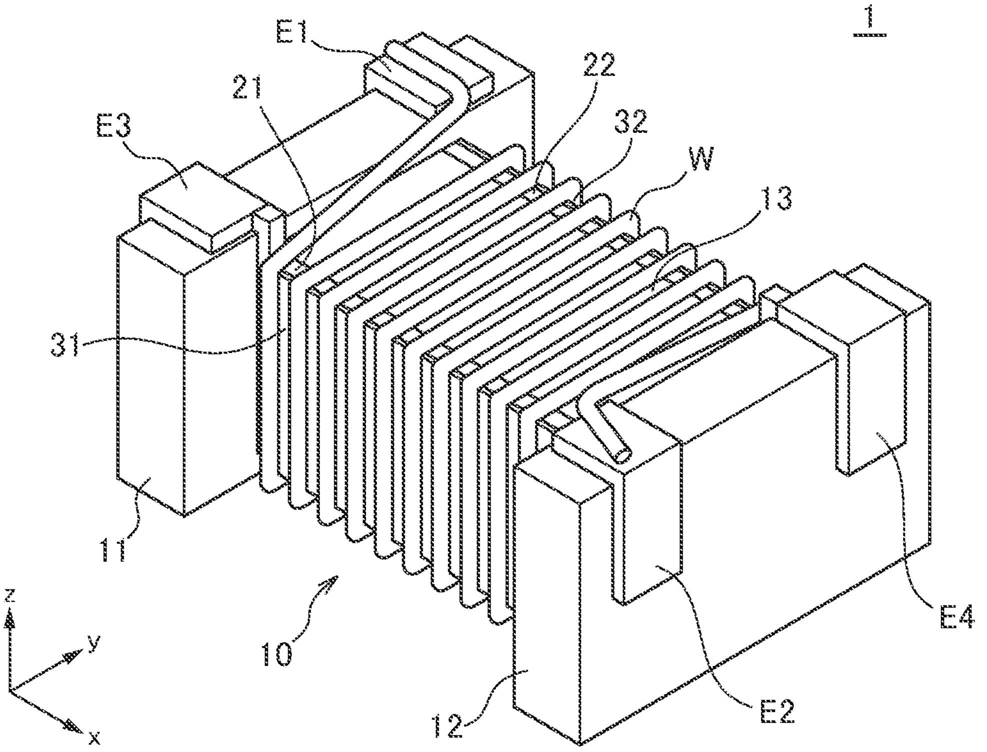
FIG. 1 is a schematic perspective view illustrating the outer appearance of a coil component 1 according to a first embodiment of the present invention.

FIG. 1 is a schematic perspective view illustrating the outer appearance of a coil component 1 according to a first embodiment of the present invention.

As illustrated in FIG. 1, the coil component 1 according to the first embodiment includes a drum-shaped core 10, terminal electrodes E1 to E4, a wire W, conductive plates 21, 22, and dielectric plates 31, 32. The drum-shaped core 10 includes a winding core part 13 whose axis extends in the x-direction, a flange part 11 provided at one end of the winding core part 13 in the x-direction, and a flange part 12 provided at the other end of the winding core part 13 in the x-direction. The drum-shaped core 10 is preferably made of a high permeability material having a permeability μ of 10 H/m to 400 H/m, such as ferrite.

The terminal electrodes E1 and E3 are provided on the flange part 11, and terminal electrodes E2 and E4 are provided on the flange part 12. The terminal electrodes E1 to E4 may each be a terminal fitting or a conductive paste applied onto the surfaces of the flange parts 11 and 12. The wire W is wound around the winding core part 13 so as to be connected at one end to the terminal electrode E1 and at the other end to the terminal electrode E2.

The conductive plates 21 and 22 are a conductive member made of metal or other material and disposed to cover the xz plane of the winding core part 13. The dielectric plates 31 and 32 are made of a dielectric material such as resin or ceramic and disposed to cover the surfaces of the conductive plates 21 and 22, respectively. That is, the wire W is wound around the winding core part 13 through the dielectric plate 31 and conductive plate 21 on one xz plane of the winding core part 13 and wound around the winding core part 13 through the dielectric plate 32 and conductive plate 22 on the other xz plane of the winding core part 13. The conductive plate 21 is connected to the terminal electrode E3, and the conductive plate 22 is connected to the terminal electrode E4. The conductive plate 21 and terminal electrode E3 may be integrally formed; similarly, the conductive plate 22 and terminal electrode E4 may be integrally formed.

Figure 2:
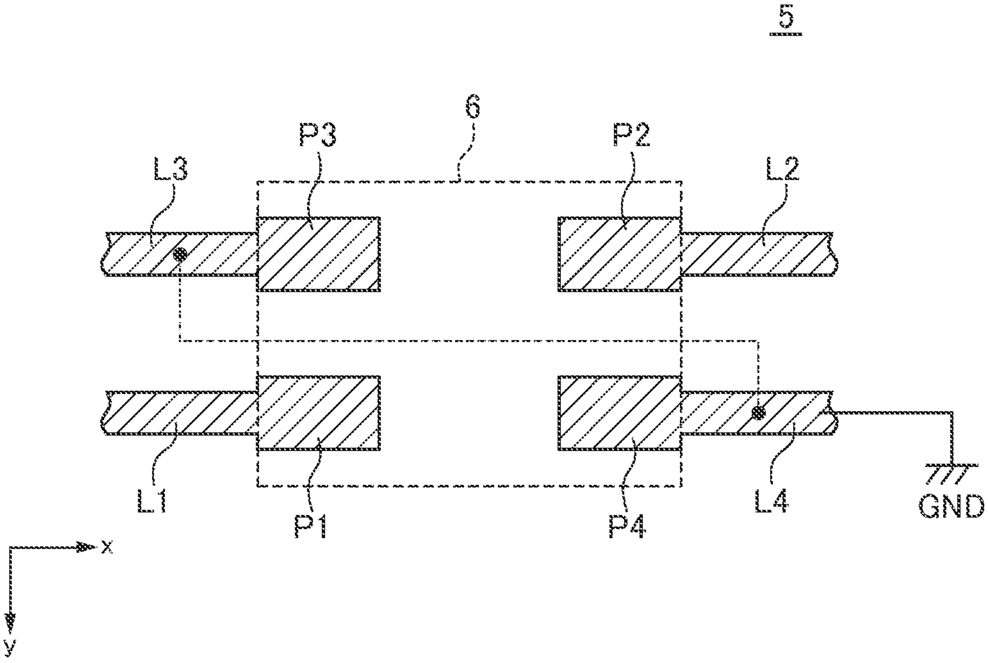
FIG. 2 is a partial plan view of a substrate 5 on which the coil component 1 is mounted.

FIG. 2 is a partial plan view of a substrate 5 on which the coil component 1 according to the present embodiment is mounted.

As illustrated in FIG. 2, the substrate 5 has a mounting area 6 in which the coil component 1 is mounted. Land patterns P1 to P4 are provided within the mounting area 6. When the coil component 1 is mounted on the mounting area 6, the terminal electrodes E1 to E4 are connected to the land patterns P1 to P4, respectively. The land patterns P1 to P4 are connected to wiring patterns L1 to L4, respectively. The wiring patterns L1 and L2 constitute a pair of input/output lines and connected to the coil component 1 through the wire W of the coil component 1. The wiring patterns L3 and L4 are a ground pattern supplied with a ground potential GND and, thus, when the coil component 1 is mounted on the substrate 5, the ground potential GND is given to the conductive plates 21 and 22. Although the wiring patterns L3 and L4 are separated from each other in the plan view of FIG. 2, they may be short-circuited in a not-shown area.

Figure 3:
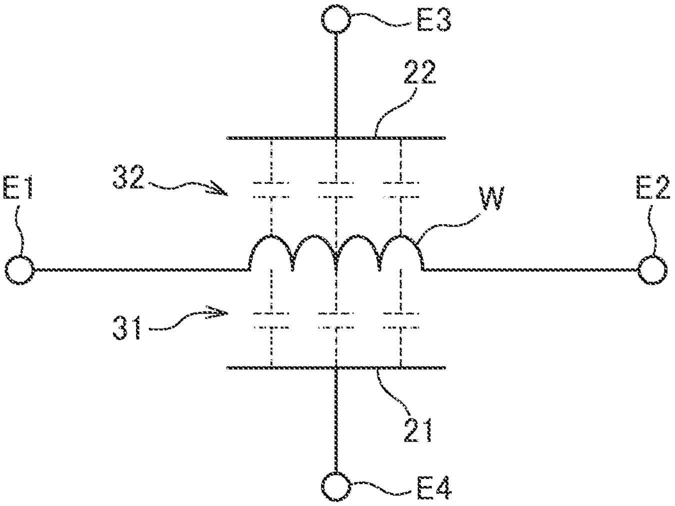
FIG. 3 is an equivalent circuit diagram of the coil component 1.

FIG. 3 is an equivalent circuit diagram of the coil component 1 according to the present embodiment.

As illustrated in FIG. 3, in the coil component 1 according to the present embodiment, the wire W functioning as a coil is connected between the terminal electrodes E1 and E2, and a capacitive component is added between the wire W and the conductive plates 21, 22. The amount of capacitive component to be added can be adjusted depending on the area of the conductive plates 21 and 22 or the thickness and dielectric constant of the dielectric plates 31 and 32. Adding such a capacitive component reduces the influence that a capacitive component generated between adjacent turns of the wire W (i.e., inter-wire capacitance) has on the self-resonant frequency, with the result that the self-resonant frequency increases. This means an apparent reduction in the inter-wire capacitance. Such an effect can be obtained even in a frequency band exceeding 1 GHz. However, when the thickness of the dielectric plates 31 and 32 is excessively small, the wire W and each of the conductive plates 21 and 22 are brought too close to each other, which may cause a high-frequency short circuit depending on a frequency band to be used. Thus, considering a frequency band to be used, the distance between the wire W and each of the conductive plates 21 and 22 is preferably designed so as not to cause the high-frequency short circuit.

As described above, the coil component 1 according to the present embodiment includes the conductive plates 21 and 22 that overlap the wire W through the dielectric plates 31 and 32, so that it is possible to make the self-resonant frequency higher than that calculated from an actual inter-wire capacitance. Further, the wire W is wound over the conductive plates 21, 22 and dielectric plates 31, 32, so that it is possible to prevent drop-off of the conductive plates 21, 22 and dielectric plates 31, 32. In addition, the conductive plates 21 and 22 are insulated from each other in the coil component, so that when the terminal electrodes E34 and E4 are connected to the same ground pattern, it is possible to prevent the conductive plates 21 and 22 from functioning as a coil to thereby prevent a reduction in inductance.

Figure 4:
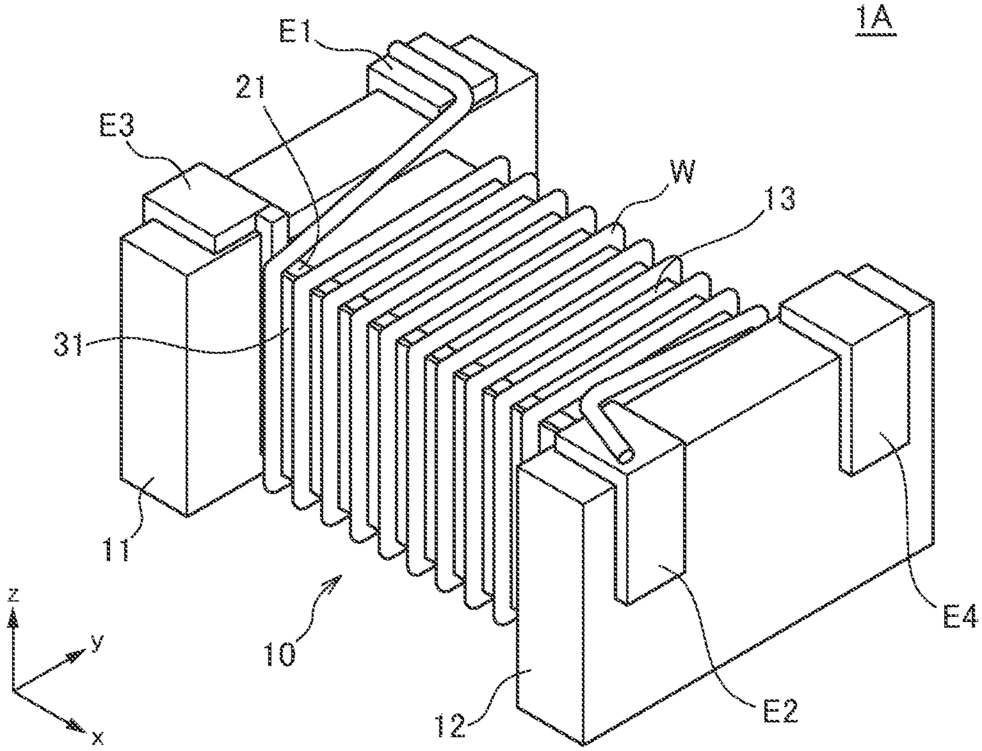
FIG. 4 is a schematic perspective view illustrating the outer appearance of a coil component 1A according to a first modification.

FIG. 4 is a schematic perspective view illustrating the outer appearance of a coil component 1A according to a first modification.

The coil component 1A according to the first modification illustrated in FIG. 4 differs from the coil component 1 according to the first embodiment in that the conductive plate 22 and dielectric plate 32 are omitted. Other basic configurations are the same as those of the coil component 1 according to the first embodiment, so the same reference numerals are given to the same elements, and overlapping description will be omitted. As exemplified in the first modification, it is sufficient to provide only one set of the conductive plate and dielectric plate. In this case, the overlapping area of the wire W and conductive plate is half that in the coil component 1 according to the first embodiment, and accordingly the value of the capacitive component to be added is half. By thus changing the number of conductive plates, the self-resonant frequency can be adjusted. In this coil component 1A according to the first modification, the terminal electrode E4 may be omitted or may be used as a dummy terminal for enhancing mounting strength.

Figure 5:
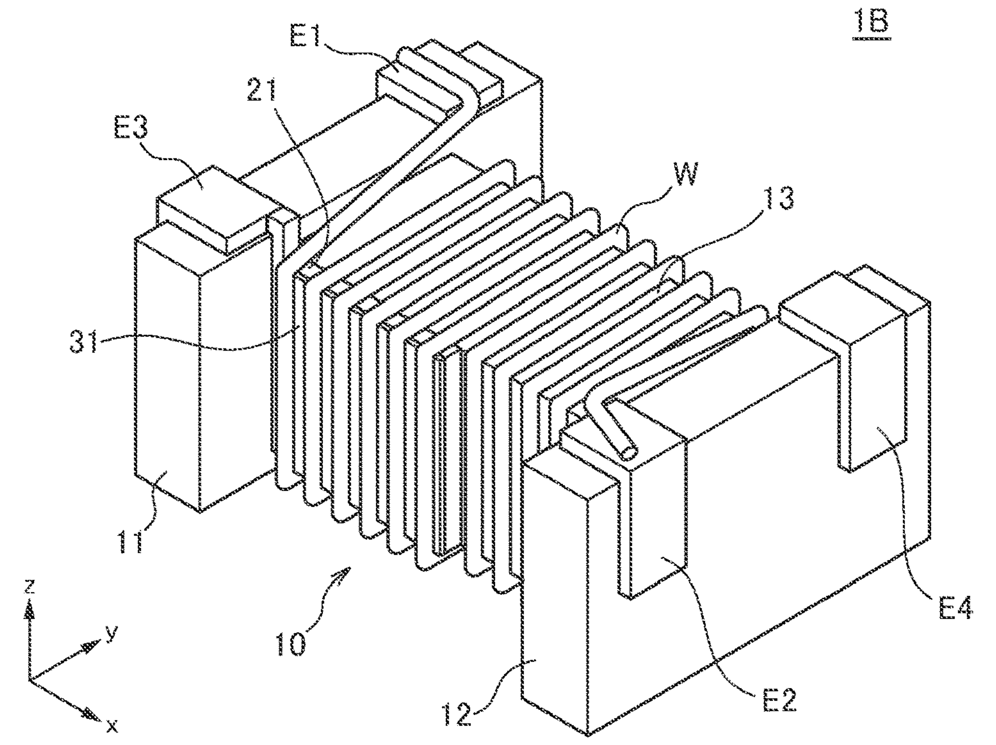
FIG. 5 is a schematic perspective view illustrating the outer appearance of a coil component 1B according to a second modification.

FIG. 5 is a schematic perspective view illustrating the outer appearance of a coil component 1B according to a second modification.

The coil component 1B according to the second modification illustrated in FIG. 5 differs from the coil component 1A according to the first modification in that the length of the conductive plate 21 and dielectric plate 31 in the x-direction is reduced by half. Other basic configurations are the same as those of the coil component 1A according to the first modification, so the same reference numerals are given to the same elements, and overlapping description will be omitted. As exemplified in the second modification, a set of the conductive plate and dielectric plate may not necessarily overlap all the turns of the wire W but may overlap only some turns. In this case, the overlapping area of the wire W and conductive plate is half that in the coil component 1A according to the first modification, and accordingly the value of the capacitive component to be added is half. By thus appropriately designing the overlapping area of the wire W and conductive plate, the self-resonant frequency can be adjusted.

Figure 6:
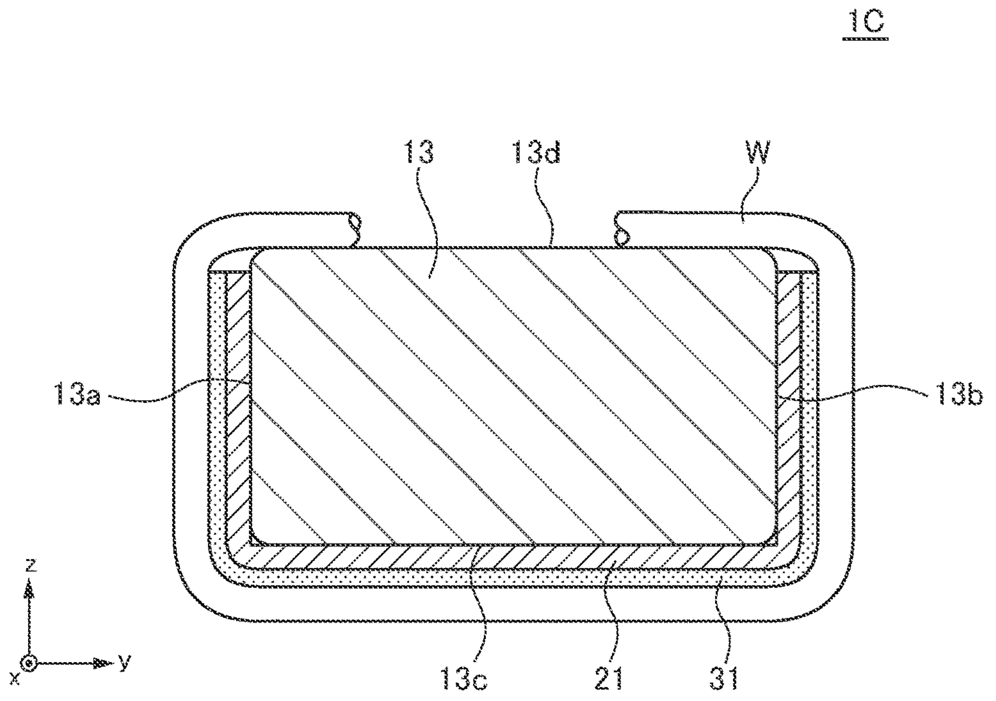
FIG. 6 is a schematic cross-sectional view for explaining the configuration of a coil component 1C according to a third modification.

FIG. 6 is a schematic cross-sectional view for explaining the configuration of a coil component 1C according to a third modification.

The coil component 1C according to the third modification illustrated in FIG. 6 differs from the coil component 1A according to the first modification in that xz planes 13*a*, 13*b* and xy plane 13*c* of the winding core part 13 are covered with the conductive plate 21 and the dielectric plate 31. Other basic configurations are the same as those of the coil component 1A according to the first modification, so the same reference numerals are given to the same elements, and overlapping description will be omitted. As exemplified in the third modification, a set of the conductive plate 21 and dielectric plate 31 may cover a plurality of surfaces of the winding core part 13.

Although an xy plane 13*d* opposite to the xy plane 13*c* is not covered with the conductive plate 21 and dielectric plate 31 in the example of FIG. 6, it may partly covered with the conductive plate 21 and dielectric plate 31. However, when the conductive plate 21 forms a loop, it functions as a coil, significantly reducing the inductance. Thus, when the conductive plate 21 covers all the four surfaces of the winding core part 13, it needs to be designed to a shape not forming a loop.

Figure 7:
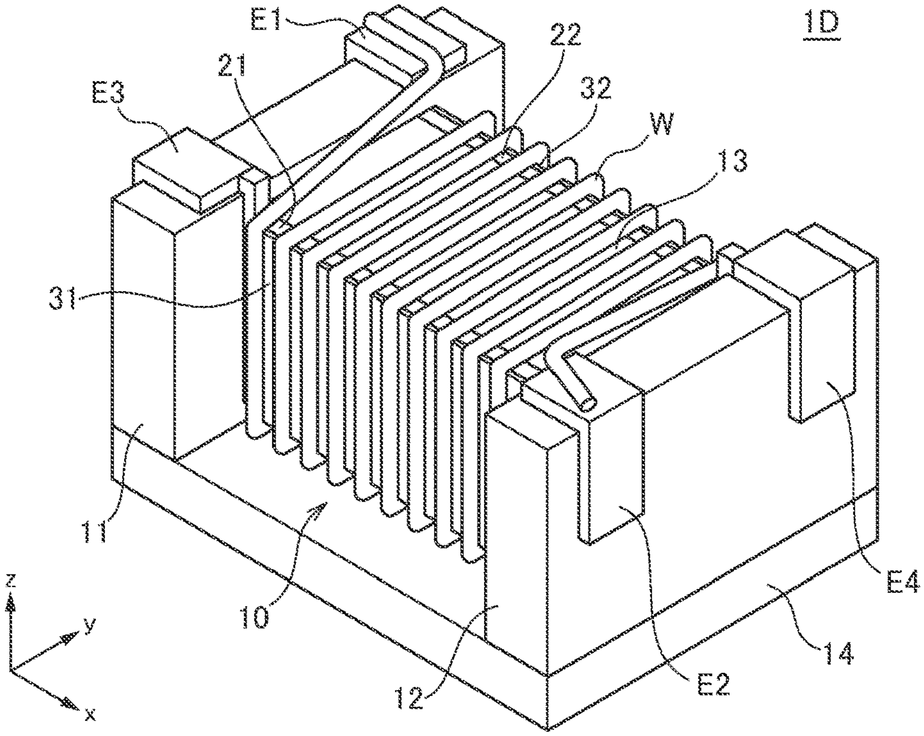
FIG. 7 is a schematic perspective view illustrating the outer appearance of a coil component 1D according to a fourth modification.

FIG. 7 is a schematic perspective view illustrating the outer appearance of a coil component 1D according to a fourth modification.

The coil component 1D according to the fourth modification illustrated in FIG. 7 differs from the coil component 1 according to the first embodiment in that a plate-like core 14 is additionally provided. Other basic configurations are the same as those of the coil component 1 according to the first embodiment, so the same reference numerals are given to the same elements, and overlapping description will be omitted.

The plate-like core 14 is fixed to the flange parts 11 and 12 and functions as a magnetic path connecting the flange parts 11 and 12. The material of the plate-like core 14 is preferably the same as the high permeability material used for the drum-shaped core 10. By thus additionally providing the plate-like core 14, a closed magnetic path is formed by the drum-shaped core 10 and plate-like core 14, making it possible to increase the inductance.

Second Embodiment

Figure 8:
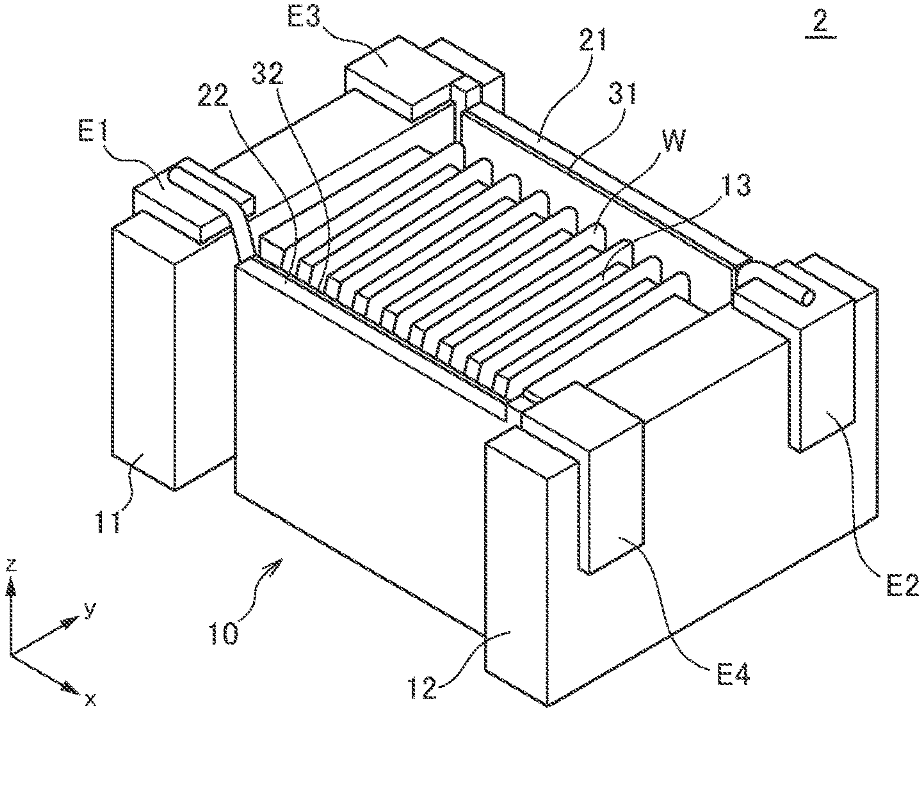
FIG. 8 is a schematic perspective view illustrating the outer appearance of a coil component 2 according to a second embodiment of the present invention.
Figure 9:
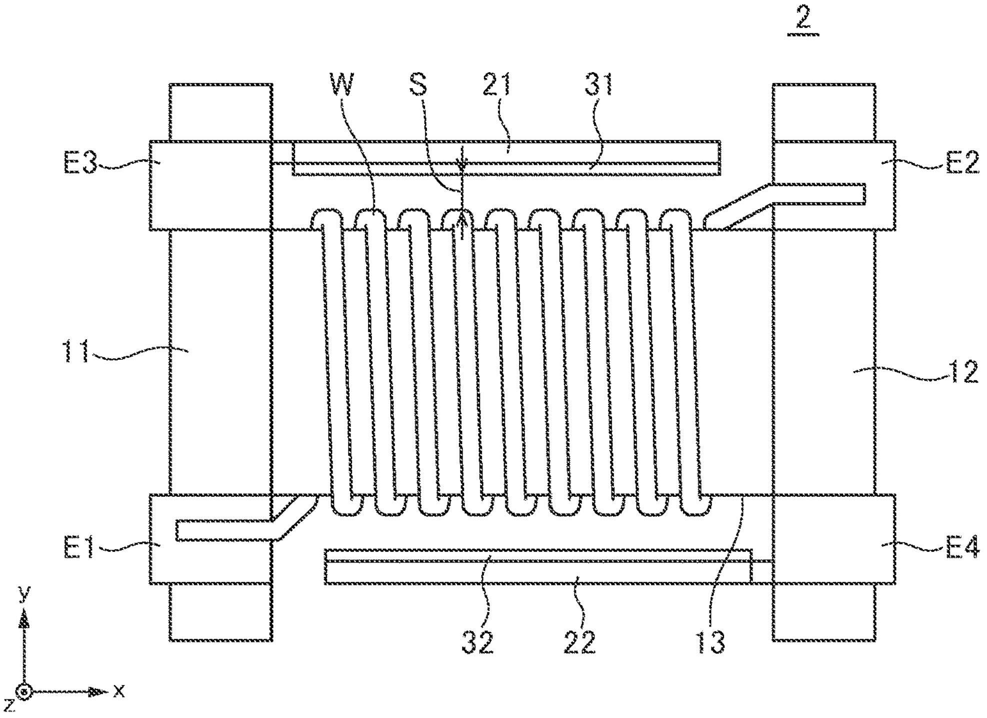
FIG. 9 is a schematic plan view of the coil component 2 as viewed in the z-direction.

FIG. 8 is a schematic perspective view illustrating the outer appearance of a coil component 2 according to a second embodiment of the present invention. FIG. 9 is a schematic plan view of the coil component 2 as viewed in the z-direction.

As illustrated in FIGS. 8 and 9, the coil component 2 according to the second embodiment differs from the coil component 1 according to the first embodiment in that the conductive plates 21, 22 and dielectric plates 31, 32 are disposed outside the wire W. In other words, the wire W is positioned between the winding core part 13 and the conductive and dielectric plates 21, 22, 31, and 32. Other basic configurations are the same as those of the coil component 1 according to the first embodiment, so the same reference numerals are given to the same elements, and overlapping description will be omitted.

In the present embodiment, a space S may be present between the wound wire W and the dielectric plates 31, 32. In this case, the self-resonant frequency can be adjusted by the size of the space S.

As exemplified in the present embodiment, the conductive plates 21, 22 and dielectric plates 31, 32 may be disposed outside the wire W.

Figure 10:
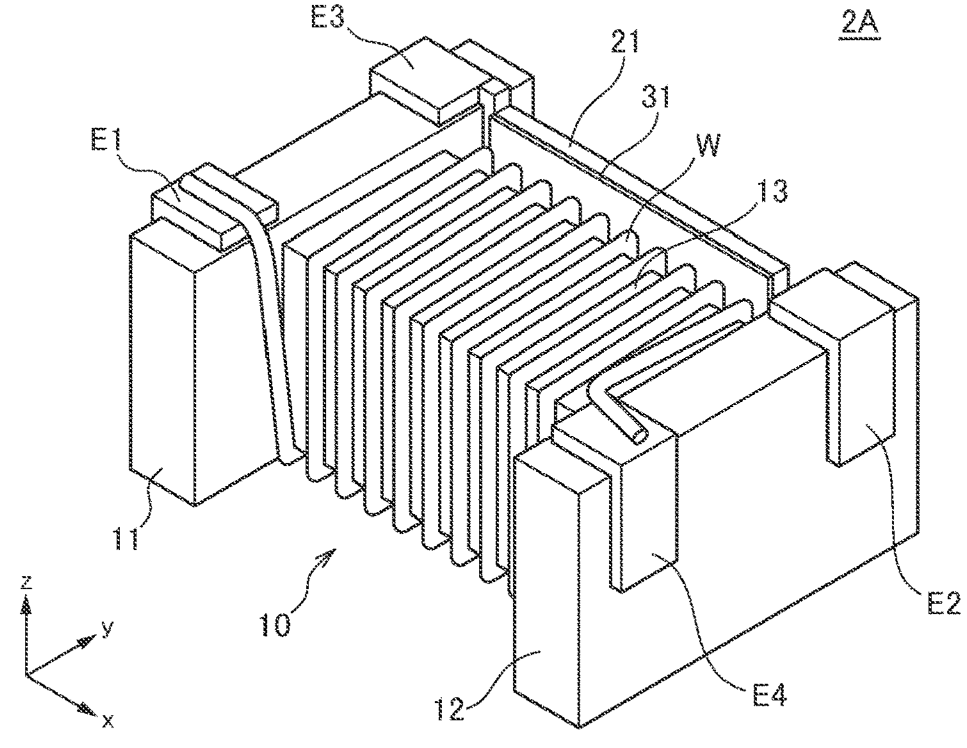
FIG. 10 is a schematic perspective view illustrating the outer appearance of a coil component 2A according to a fifth modification.

FIG. 10 is a schematic perspective view illustrating the outer appearance of a coil component 2A according to a fifth modification.

The coil component 2A according to the fifth modification illustrated in FIG. 10 differs from the coil component 2 according to the second embodiment in that the conductive plate 22 and dielectric plate 32 are omitted. Other basic configurations are the same as those of the coil component 2 according to the second embodiment, so the same reference numerals are given to the same elements, and overlapping description will be omitted. As exemplified in the fifth modification, it is sufficient to provide only one set of the conductive plate and dielectric plate.

Third Embodiment

Figure 11:
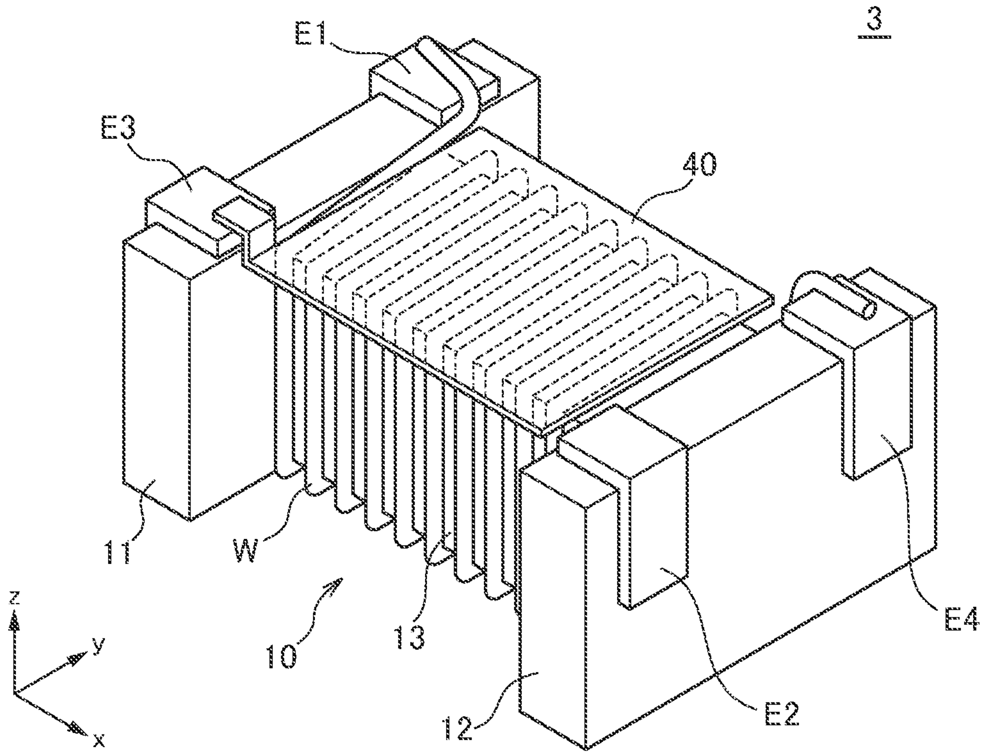
FIG. 11 is a schematic perspective view illustrating the outer appearance of a coil component 3 according to a third embodiment of the present invention.

FIG. 11 is a schematic perspective view illustrating the outer appearance of a coil component 3 according to a third embodiment of the present invention.

Figure 12:
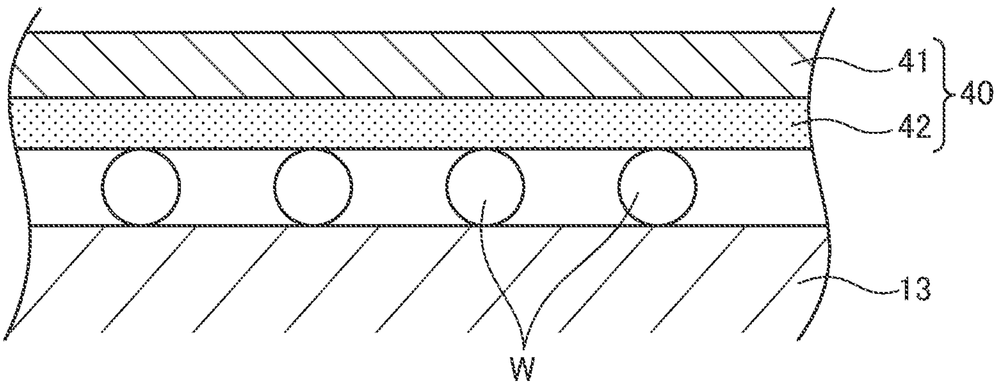
FIG. 12 is a partial cross-sectional view illustrating the coil component 3.

As illustrated in FIG. 11, the coil component 3 according to the third embodiment differs from the coil component 2 according to the second embodiment in that the wound wire W is covered with an insulation sheet with copper foil (RCC) 40. As illustrated in a cross-sectional view of FIG. 12, the insulation sheet with copper foil 40 has a laminated structure of a copper foil 41 and a resin layer 42. The resin layer 42 is positioned between the copper foil 41 and the wire W. The copper foil 41 is connected to the terminal electrode E3. Other basic configurations are the same as those of the coil component 2A according to the fifth modification, so the same reference numerals are given to the same elements, and overlapping description will be omitted.

In the present embodiment, the copper foil 41 constituting the insulation sheet with copper foil 40 functions as a conductive member, and the resin layer 42 constituting the insulation sheet with copper foil 40 functions as a dielectric. Thus, in the present embodiment, the insulation sheet with copper foil 40 is disposed on the wound wire W, reducing the manufacturing cost of the coil component.

Figure 13:
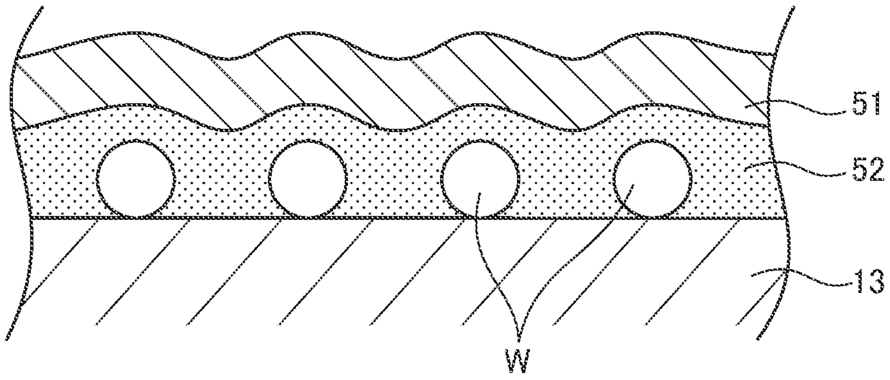
FIG. 13 is a partial cross-sectional view illustrating a coil component according to a sixth modification.

Alternatively, the following modification may be made. In a sixth modification illustrated in FIG. 13, an insulating resin 52 is applied onto the surface of the winding core part 13 so as to embed therein the wire W, a conductive resin 51 is applied onto the insulating resin 52, and the conductive resin 51 is electrically connected to the terminal electrode E3. In this case, the manufacturing cost of the coil component can further be reduced.

It is apparent that the present invention is not limited to the above embodiments, but may be modified and changed without departing from the scope and spirit of the invention.

What is claimed is:

1. A coil component comprising:

a core having a winding core part, a first flange part positioned at one axial end of the winding core part, and a second flange part positioned at other axial end of the winding core part;

a wire wound around the winding core part;

a first conductive member having a plate-like shape and overlapping the wire through a dielectric;

a first terminal electrode provided on the first flange part and connected to one end of the wire;

a second conductive member having a plate-like shape and overlapping the wire through another dielectric;

a second terminal electrode provided on the second flange part and connected to other end of the wire; and a third terminal electrode provided on the first flange part and connected to the first conductive member, wherein the winding core part includes first and second surfaces, wherein the wire includes a first section covering the first surface of the winding core part and a second section covering the second surface of the winding core part, wherein the first conductive member overlaps the first section of the wire without overlapping the second section of the wire, and wherein the second conductive member overlaps the second section of the wire without overlapping the first section of the wire.

2. The coil component as claimed in claim 1, wherein the first conductive member is positioned between the winding core part and the wire.

3. The coil component as claimed in claim 1, wherein the wire is positioned between the winding core part and the first conductive member.

4. The coil component as claimed in claim 1, further comprising:

a fourth terminal electrode provided on the second flange part and connected to the second conductive member, wherein the first and second conductive members are insulated from each other.

5. The coil component as claimed in claim 1, wherein the first surface and the second surface are orthogonal to each other.

6. The coil component as claimed in claim 1, wherein the first surface and the second surface are parallel to each other.

7. The coil component as claimed in claim 1, wherein the winding core part further includes third surface, and wherein the first and second conductive member do not overlap a third section of the wire.

8. A circuit board comprising:

a substrate having first, second, and third land patterns; and a coil component comprising:

a core having a winding core part, a first flange part positioned at one axial end of the winding core part, and a second flange part positioned at other axial end of the winding core part;

a wire wound around the winding core part;

a first conductive member having a plate-like shape and overlapping the wire through a dielectric;

a second conductive member having a plate-like shape and overlapping the wire through another dielectric;

a first terminal electrode provided on the first flange part and connected to one end of the wire;

a second terminal electrode provided on the second flange part and connected to other end of the wire; and a third terminal electrode provided on the first flange part and connected to the first conductive member, and wherein the coil component is mounted on the substrate such that the first, second, and third terminal electrodes are connected respectively to the first, second, and third land patterns, wherein the winding core part includes first and second surfaces, wherein the wire includes a first section covering the first surface of the winding core part and a second section covering the second surface of the winding core part, wherein the first conductive member overlaps the first section of the wire without overlapping the second section of the wire, and wherein the second conductive member overlaps the second section of the wire without overlapping the first section of the wire.

9. The circuit board as claimed in claim 8, wherein the third land pattern is supplied with a ground potential.

10. The circuit board as claimed in claim 8, wherein the first conductive member is positioned between the winding core part and the wire.

11. The circuit board as claimed in claim 8, wherein the wire is positioned between the winding core part and the first conductive member.

12. The circuit board as claimed in claim 8, wherein the substrate further has a fourth land pattern, wherein the coil component further comprises:

a second conductive member having a plate-like shape and overlapping the wire through another dielectric; and a fourth terminal electrode provided on the second flange part and connected to the second conductive member, and wherein the coil component is mounted on the substrate such that the fourth terminal electrodes is connected to the fourth land pattern.

13. The circuit board as claimed in claim 12, wherein the third and fourth land patterns are short-circuited.

14. A coil component comprising:

a core having a first flange part, a second flange part, and a winding core part positioned between the first and second flange parts, the winding core part including first and second surfaces;

a wire wound around the winding core part, the wire including a first section covering the first surface of the winding core part and a second section covering the second surface of the winding core part;

a first conductive member covering the first surface of the winding core part without covering the second surface of the winding core part, the first conductive member overlapping the first section of the wire without overlapping the second section of the wire;

a second conductive member having a plate-like shape and overlapping the wire through another dielectric, the second conductive member overlapping the second section of the wire without overlapping the first section of the wire;

a wire wound around the winding core part such that the first conductive member is sandwiched between the first surface of the winding core part and the wire;

a first terminal electrode provided on the first flange part and connected to a first end of the wire;

a second terminal electrode provided on the second flange part and connected to a second end of the wire; and a third terminal electrode provided on the first flange part and connected to the first conductive member.

15. The coil component as claimed in claim 14, wherein the winding core part further includes third and fourth surfaces, wherein the first surface and the second surface are parallel to each other, wherein the third surface and the fourth surface are parallel to each other, wherein the first and second surfaces and the third and fourth surfaces are orthogonal to each other, wherein the wire is wound around the winding core part over the first, second, third, and fourth surfaces of the winding core part, and wherein the first conductive member covers the first surface of the winding core part without covering the second, third, and fourth surfaces of the winding core part.

16. The coil component as claimed in claim 14, wherein the second conductive member is sandwiched between the second surface of the winding core part and the wire.

17. The coil component as claimed in claim 16, wherein the first surface and the second surface are parallel to each other.

18. The coil component as claimed in claim 17, wherein the winding core part further includes third and fourth surfaces, wherein the first and second surfaces and the third and fourth surfaces are orthogonal to each other, wherein the wire is wound around the winding core part over the first, second, third, and fourth surfaces of the winding core part, wherein the first conductive member covers the first surface of the winding core part without covering the second, third, and fourth surfaces of the winding core part, and wherein the second conductive member covers the second surface of the winding core part without covering the first, third, and fourth surfaces of the winding core part.

* * * * *